United States Patent
Cho et al.

(10) Patent No.: US 8,626,188 B2
(45) Date of Patent: Jan. 7, 2014

(54) METHOD AND SERVER FOR ESTIMATING POSITION OF MOBILE NODE

(75) Inventors: Seong Yun Cho, Daejeon (KR);
Youngwoo Choi, Daejeon (KR);
Jooyoung Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/237,110

(22) Filed: Sep. 20, 2011

(65) Prior Publication Data
US 2012/0071170 A1 Mar. 22, 2012

(30) Foreign Application Priority Data
Sep. 20, 2010 (KR) .......... 10-2010-0092724
May 20, 2011 (KR) .......... 10-2011-0048002

(51) Int. Cl.
*H04M 1/00* (2006.01)

(52) U.S. Cl.
USPC ............ 455/456.1; 455/404.2; 455/414.2; 455/414.4; 455/440; 455/456.2; 455/457

(58) Field of Classification Search
USPC ........... 455/456.1, 404.2, 414.2–414.4, 440, 455/456.2–457
See application file for complete search history.

(56) References Cited

U.S. PATENT DOCUMENTS

| | | | |
|---|---|---|---|
| 2005/0143100 A1* | 6/2005 | Shi et al. ................ | 455/456.6 |
| 2007/0159986 A1* | 7/2007 | Park et al. .............. | 370/254 |
| 2008/0268873 A1* | 10/2008 | Wymeersch et al. ...... | 455/456.6 |
| 2009/0005064 A1 | 1/2009 | Malik et al. | |
| 2009/0209268 A1* | 8/2009 | Ha et al. ................. | 455/456.1 |
| 2011/0304503 A1* | 12/2011 | Chintalapudi et al. ... | 342/357.29 |

FOREIGN PATENT DOCUMENTS

| | | |
|---|---|---|
| KR | 10-0583401 | 5/2006 |
| KR | 10-0583460 | 6/2006 |

\* cited by examiner

*Primary Examiner* — Meless Zewdu
*Assistant Examiner* — Michael Nguyen
(74) *Attorney, Agent, or Firm* — Staas & Halsey LLP (57) ABSTRACT

A position estimation server estimates the position of a target mobile node by using position information of a minimum number of anchor nodes knowing their position, distance information estimated between mobile nodes or between the anchor nodes and the mobile nodes, and connectivity information.

14 Claims, 9 Drawing Sheets

METHOD AND SERVER FOR ESTIMATING POSITION OF MOBILE NODE

CROSS-REFERENCE TO RELATED APPLICATION

This application claims priority to and the benefit of Korean Patent Application Nos. 10-2010-0092724 and 10-2011-0048002 filed in the Korean Intellectual Property Office on Sep. 20, 2010 and May 20, 2011, the entire contents of which are incorporated herein by reference.

BACKGROUND OF THE INVENTION (a) Field of the Invention

The present invention relates to a method and server for estimating the position of a mobile node, and more particularly, to a method for estimating the position of a mobile node by using anchor nodes that know their position information.

(b) Description of the Related Art

Positioning systems include a Global Positioning System (GPS), Inertial Navigation System (INS), LORAN (Long Range Aid to Navigation), RFID/USN (Radio Frequency Identification/Ubiquitous Sensor Network), and a method using wireless/mobile communication infrastructures.

Moreover, services using positioning include a method of estimating the position of a home node to get a service and a method of estimating the position of a foreign node to get a service. In these services, if position information of the foreign node is required, the home node wirelessly receives its own position information, calculated by the foreign node, from the foreign node, or receives a signal reflected by a transmitted signal, such as a radar signal, and calculates the position information of the foreign node, or receives the position of the foreign node from a position calculation server.

In general, GPS is most commonly used for positioning. However, the GPS does not work indoors, buildings, forests, and so forth because a GPS signal is blocked, and can give wrong position information due to a jammer.

When the GPS cannot be used, the position of a mobile terminal can be estimated by a wireless communication infrastructure. To this end, multiple anchor nodes that know their exact installation position should be installed. However, it might be impossible to install and use the anchor nodes in a wide area due to the problems of cost, equipment availability, and the like.

Recently, a variety of position estimation technologies based on a wireless communication infrastructure have been developed to calculate the position of a mobile terminal. Wireless communication infrastructures used for position estimation include WLAN, ZigBee, Ultra Wideband (UWB), Chirp Spread Spectrum (CSS), etc. These infrastructures have limitations in constructing a position estimation system for service in a wide area because of their narrow transmission and reception coverage. Among these infrastructures, IEE 802.15.4a-based Impulse Radio-UWB (IR-UWB), which can be used for high-precision position estimation because it is capable of correctly estimating distance, has the drawback of a narrow coverage of about 20 to 30 m due to its limitation of transmission power. Therefore, in attempting to provide a location-based service in wide indoor and outdoor areas based on such an wireless communication infrastructure, there is a difficulty of installing a large number of anchor nodes in an overlapping manner.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and server for estimating the position of a mobile node, which allows precise estimation of the position of a mobile node by using a minimum number of anchor nodes knowing their position information.

An exemplary embodiment of the present invention provides a method for estimating the positions of a plurality of mobile nodes by a position estimation server. The position estimation method includes: receiving at least one information required for position estimation, among the position information of at least two anchor nodes knowing their position, connectivity information between the anchor nodes and mobile nodes, distance information estimated between the anchor nodes and the mobile nodes, and distance information estimated between the mobile nodes; and estimating the position of at least one target mobile nodes of the plurality of mobile nodes by using the at least one information required for position estimation.

The estimating may include sequentially estimating the position of the at least one target mobile nodes by using the at least one information required for position estimation.

The sequential estimating may include estimating the positions of the at least one target mobile nodes, starting from the mobile node connected to the largest number of reference nodes among the target mobile nodes, wherein the reference nodes may include anchor nodes knowing their position and mobile nodes whose positions have been estimated.

The estimating may further include estimating the position of the at least one target mobile nodes in a batch manner by using the estimated position information of the at least one target mobile nodes after sequentially estimating the position of the at least one target mobile nodes.

The batch estimating may include: setting the position of a target mobile node to an arbitrary nominal point; estimating an error in the nominal point with respect to the actual position of the target mobile node by using the information required for position estimation; updating the nominal point using the error; and estimating the nominal point as the position of the target mobile node until the error is less than a predetermined value.

The error estimating may include: calculating the difference between the distance information estimated between the mobile nodes and the distance information between the mobile nodes calculated based on the nominal point by using the at least one information required for position estimation; and calculating the error in the nominal point by using the difference.

The at least one information required for position estimation may further include position information of a mobile node calculated by a mobile node capable of receiving a satellite signal, among a plurality of mobile nodes.

According to another exemplary embodiment of the present invention, there is provided a server for estimating the position of a plurality of nodes. The position estimation server includes an information collector and an estimator. The information collector receives, from one of at least two anchor nodes knowing their position, at least one information required for position estimation, among position information of two anchor nodes, connectivity information between the anchor nodes and the plurality of mobile nodes, distance information estimated between the anchor nodes and the mobile nodes, and distance information estimated between the plurality of mobile nodes. The estimator estimates the positions of the plurality of mobile nodes by using the at least one information required for position estimation.

The position estimator may further include an estimation method selector for selecting one position estimation method to estimate the positions of the plurality of mobile nodes. The position estimation method may include a sequential method for sequentially estimating the positions of the plurality of mobile nodes and a batch method for estimating the positions of the plurality of mobile nodes in a batch manner.

When initially starting the position estimation of the plurality of mobile nodes, the estimation method selector may select the batch method as the position estimation method.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the words "comprise" and "include" and variations such as "comprises", "comprising", "includes", and "including" will be understood to imply the inclusion of stated elements but not the exclusion of any other elements.

Now, a method and server for estimating the position of a mobile node according to an exemplary embodiment of the present invention will be described in detail with reference to the drawings.

Figure 1:
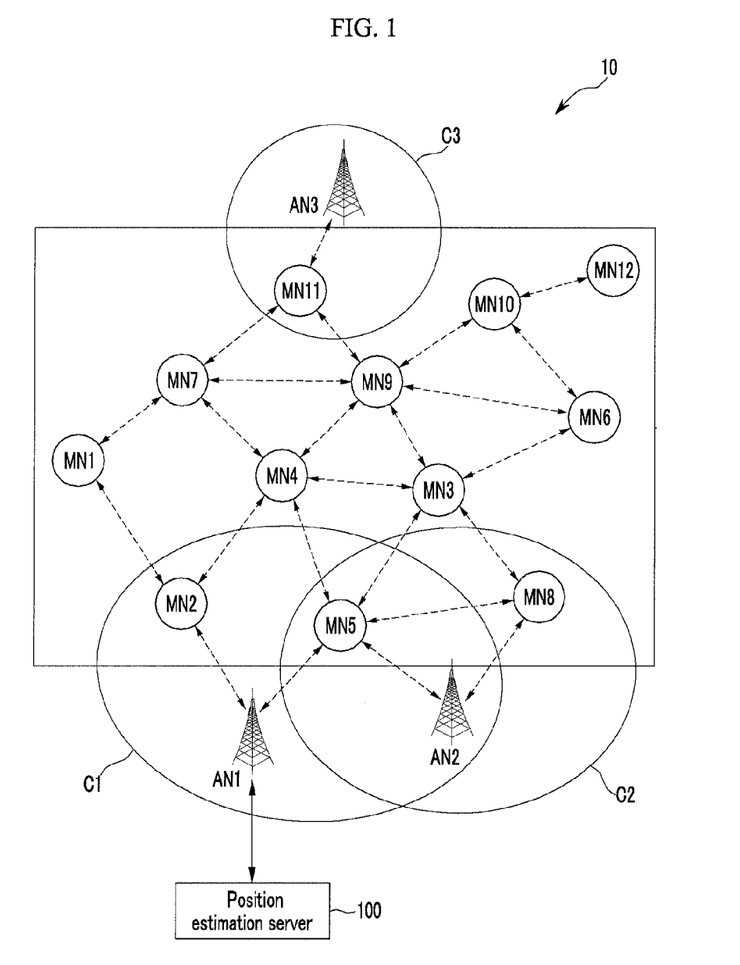
FIG. 1 is a view showing a position estimation system according to a first exemplary embodiment of the present invention.

FIG. 1 is a view showing a position estimation system according to a first exemplary embodiment of the present invention.

Referring to FIG. 1, the position estimation system 10 includes a few anchor nodes AN1, AN2, and AN3 knowing their own position information, a plurality of mobile nodes MN1 to MN12 within a position estimation service area, and a position estimation server 100.

The anchor nodes AN1, AN2, and AN3 are fixed to cells. One of the anchor nodes AN1, AN2, and AN3, for example, the anchor node AN1 is a node that collects information to estimate the positions of the mobile nodes MN1 to MN12. The anchor node AN1 can be connected to the position estimation server 100, or perform the function of the position estimation server 100. The anchor node AN1 can collect information by performing communication with the nodes within its coverage C1, and transmit the collected information to the position estimation server 100.

Another one of the anchor nodes AN1, AN2, and AN3, for example, the anchor node AN2, is a node which is located within the coverage C1 of the anchor node AN1. This node is used to estimate the position of the mobile nodes MN1 to MN12. The anchor node AN2 can perform communication with the nodes within its coverage C2. The anchor node AN2 knows its own position information. Otherwise, the anchor node AN1 is able to estimate the position of the anchor node AN2.

The remaining one of the anchor nodes AN1, AN2, and AN3, for example, the anchor node AN3, is a node which is located out of the coverage C1 of the anchor node AN1 or out of the coverage C2 of the anchor node AN2 and knows its own position information. The anchor node AN3 also can perform communication with the nodes within its coverage C3. One or more anchor nodes AN3 of this type may be present.

The mobile nodes MN1 to MN12 can set up a connection to other mobile nodes located within their coverage or to one of the anchor nodes AN1 to AN3 connectable by them to estimate the distance, and can transmit and receive the estimated distance information and their connectivity information.

The position estimation server 100 may be connected to the anchor node AN1, or implemented within the anchor node AN1. The position estimation server 100 estimates the positions of the mobile nodes MN1 to MN12 within the position estimation service area 1 based on the information collected by the anchor node AN1. Examples of the information collected by the anchor node AN1 may include the position information of the anchor nodes AN1 to AN3, the connectivity information of the mobile nodes MN1 to MN12, the estimated distance information, and so on.

Figure 2:
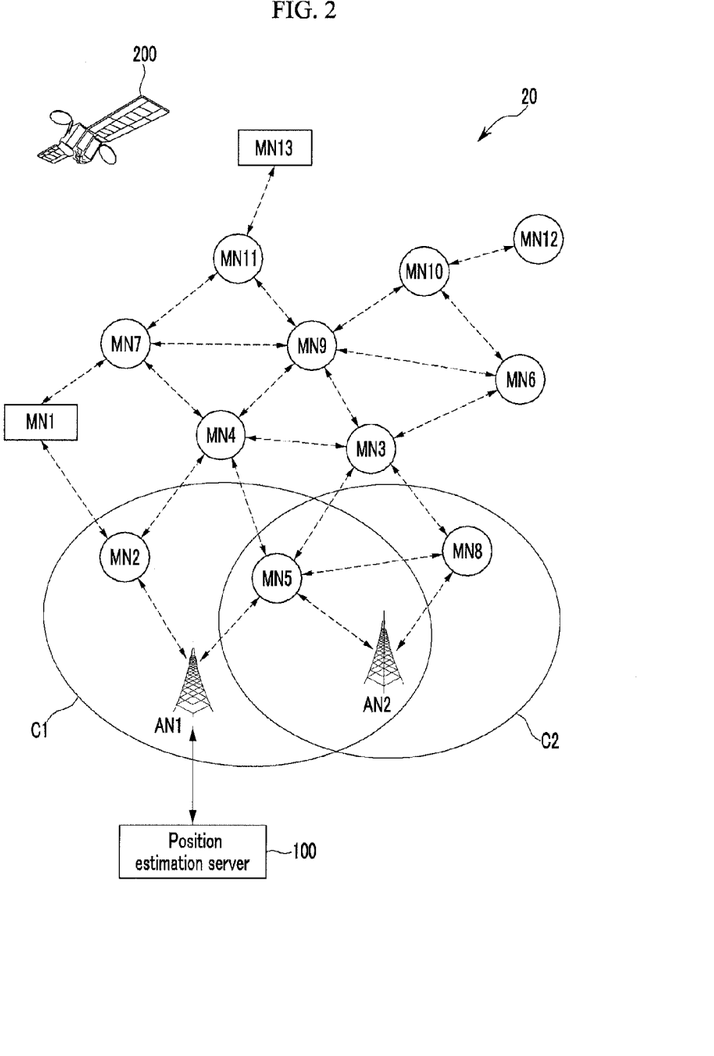
FIG. 2 is a view showing a position estimation system according to a second exemplary embodiment of the present invention.

FIG. 2 is a view showing a position estimation system according to a second exemplary embodiment of the present invention.

The position estimation system illustrated in FIG. 2 can be adapted to an environment in which no position estimation service area is defined and GPS/GNSS information can be used.

Referring to FIG. 2, the position estimation system 20 can include a few anchor nodes AN1 and AN2, a plurality of mobile nodes MN1 to MN13, a position estimation server 100, and a satellite 200.

The anchor nodes AN1 and AN2 can operate as explained in FIG. 1.

At least one of the mobile nodes MN1 to MN13, for example, the mobile nodes MN1 and MN13 receive a satellite signal from the satellite 200, and estimate their own position information based on the satellite signal. The satellite 200 may be a GPS satellite, a GLONASS satellite, or a Galileo satellite.

As explained in FIG. 1, the mobile nodes MN1 to MN13 can set up a connection to other mobile nodes located within their coverage or to one of the anchor nodes AN1 and AN2 to estimate the distance, and can function to transmit and receive their connectivity information and the estimated distance information.

The position estimation server 100 estimates the position of a target mobile node, among the mobile nodes MN1 to MN13, based on the information collected by the anchor node AN1. Examples of the information collected by the anchor node AN1 may include the position information of the anchor node AN2, the position information of the mobile nodes MN1 and MN13, whose positions can be estimated based on a GPS or GNSS satellite signal, among the mobile nodes MN1 to MN12, the connectivity information of the mobile nodes MN1 to MN13, the estimated distance information, and the like.

An anchor node (AN3 of FIG. 1) is not illustrated in FIG. 2, and the position estimation system 20 may further include one or more anchor nodes (AN3 of FIG. 1) or not.

Figure 3:
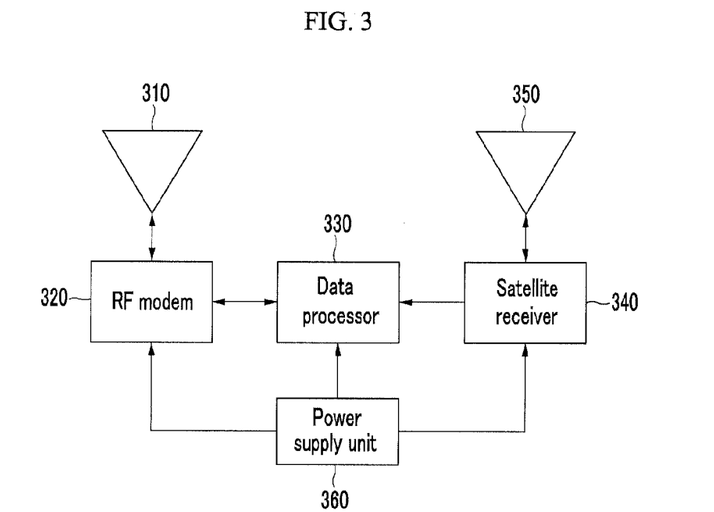
FIG. 3 is a block diagram of a mobile node according to an exemplary embodiment of the present invention.

FIG. 3 is a block diagram of a mobile node according to an exemplary embodiment of the present invention.

Although FIG. 3 illustrates the mobile node MN1, other mobile nodes MN2 to MN12 or the mobile node MN13 of FIG. 2 may have the same or similar configuration as the mobile node MN1.

Referring to FIG. 3, the mobile node MN1 includes a transmitting and receiving antenna 310, an RF modem 320, a data processor 330, a satellite receiver 340, a receiving antenna 350, and a power supply unit 360.

The transmitting and receiving antenna 310 receives data from other mobile nodes and sends it to the RF modem 320, and the data received from the RF modem 320 is transmitted to a foreign node. In other words, the transmitting and receiving antenna 310 wirelessly sends and receives data between the anchor nodes AN1 to AN3 and the RF modem 320 or between other mobile nodes and the RF modem 320. The foreign node may be an anchor node AN1 to AN3 or some other mobile node.

The RF modem 320 sets up a connection between the foreign node and the home node, i.e., mobile node MN1, and measures information required for distance estimation. For instance, the RF modem 320 may measure a round trip time (RTT) or a received signal strength (RSS) through signal transmission and reception to and from the foreign node.

The RF modem 320 may be an RF modem for wireless local area network (WLAN), ZigBee, Ultra Wideband (UWB), and Chirp Spread Spectrum (CSS).

The data processor 330 processes the data received by the RF modem 320 and the data to be sent. The data processor 330 estimates the distance to the foreign node by using the RTT or RSS measured by the RF modem 320.

That is, the data processor 330 performs all the processes, including interfacing with the RF modem 320 and data processing, interfacing with the satellite receiver 340 and data processing, and estimating the distance between mobile nodes.

The satellite receiver 340 calculates its position based on a satellite signal from the satellite 200, and delivers navigation information including the calculated position to the data processor 330.

The receiving antenna 350 receives the satellite signal from the satellite 200, and delivers it to the satellite receiver 330.

The satellite receiver 340 and the receiving antenna 350 may be omitted from the mobile node MN1 in some cases. For example, in the system as shown in FIG. 1, the mobile nodes MN2 to MN12 may not require the satellite receiver 340 and the receiving antenna 350.

The power supply unit 360 supplies power to the mobile node MN1. The power supply unit 360 may be a portable battery. At this point, if the RF modem 320, the data processor 330, and the satellite receiver 340 use different voltages, the power supply unit 360 can supply the RF modem 320, the data processor 330, and the satellite receiver 350 with the required voltages, respectively, through a regulator (not shown).

Figure 4:
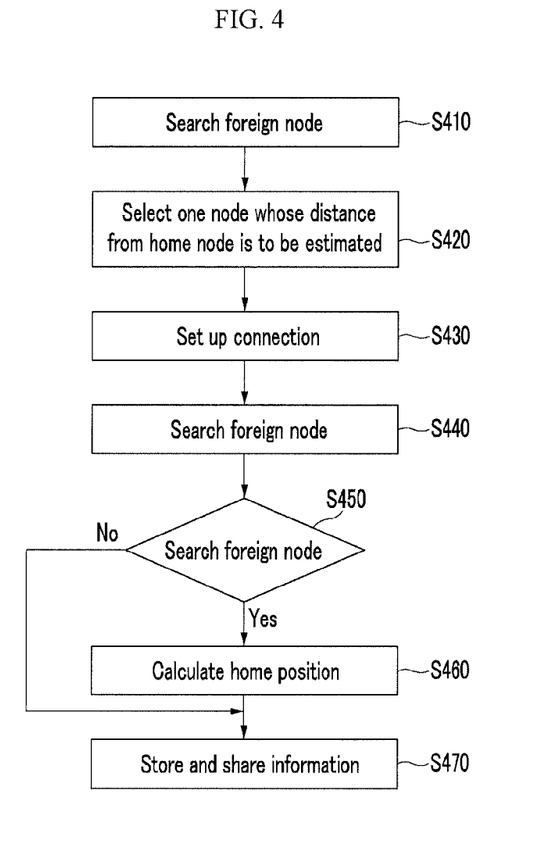
FIG. 4 is a view showing a method for a mobile node to estimate the distance to a foreign node according to an exemplary embodiment of the present invention.

FIG. 4 is a view showing a method for a mobile node to estimate the distance to a foreign node according to an exemplary embodiment of the present invention.

FIG. 4 illustrates a method for estimating the distance to a foreign node from the mobile node MN1. The foreign node may be an anchor node within the coverage of the mobile node MN1 or some other mobile node.

Referring to FIG. 4, the mobile node MN1 searches the foreign node connectable to itself, that is, present within its coverage (S410).

The mobile node MN1 sends a node search signal, receives acknowledgement signals from the nodes that have sent them in response to the node search signal, and then selects a node, whose distance from the mobile node MN1 is to be estimated, from among the nodes that have sent the received acknowledgement signals (S420). After that, the mobile node MN1 sets up a connection to the selected node (S430).

The mobile node MN1 estimates the distance to the connected foreign node (S440). At this point, the mobile node MN1 can estimate the distance by using a predetermined method. For example, the mobile node MN1 may estimate the distance by using RTT or RSS. Moreover, the mobile node MN1 may estimate the distance by using Symmetric Double Sided-Two Way Ranging (SDS-TWR).

Meanwhile, if the mobile node MN1 is able to receive a satellite signal from a satellite (S450), it can calculate its position based on the satellite signal (S460).

The mobile node MN1 stores its identifier, the identifier of the foreign node connected to itself to estimate the distance, estimated distance information, and connectivity information between itself and the foreign node, and shares them with the foreign node (S470). At this point, the mobile node MN1 is able to store its position information and share it with the foreign node as long as it can calculate its position information.

Further, the mobile node MN1 is able to receive, from the foreign node, connectivity information with other nodes, stored in the foreign node connected to itself, and store it.

The mobile node MN1 can estimate the distance to the foreign node by using the above-explained method until the connection to the foreign node is released.

In addition, the mobile node MN1 can release the connection to the foreign node and set up a connection to another foreign node to estimate the distance by using the above-explained method.

The other mobile nodes MN2 to MN12 also are able to estimate the distance to the foreign node in the same method as the mobile node MN1, and can store information on the distance to the foreign node, connectivity information, the identifiers of two nodes between which a connection is set up, and so on, and share them with the foreign node.

Through this procedure, the mobile node MN1 can share connectivity information of the other mobile nodes MN2 to MN12, estimated distance information of the mobile nodes MN2 to MN12, and a specific mobile node's position information acquired by the satellite. As such information is shared between the mobile nodes, it may be possible for the anchor nodes AN1 and AN2 to collect the connectivity information of all the mobile nodes and the position information estimated between the mobile nodes. Additionally, the anchor node AN1 transmits the collected information to the position estimation server 100.

Figure 5:
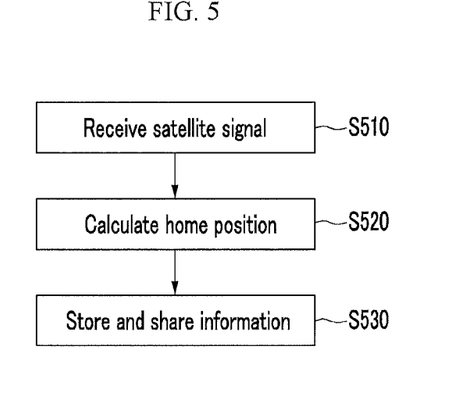
FIG. 5 is a view showing a method which enables a mobile node to estimate the position itself according to an exemplary embodiment of the present invention.

FIG. 5 is a view showing a method which enables a mobile node to estimate the position itself according to an exemplary embodiment of the present invention.

Referring to FIG. 5, the mobile nodes (MN1 to MN13 of FIG. 2) can calculate their position themselves if they are able to receive a satellite signal from the satellite.

The mobile nodes (MN1 and MN13 of FIG. 2) capable of receiving a satellite signal, among the mobile nodes MN1 to MN13, receive the satellite signal (S510), and calculate their position based on the satellite signal (S520).

The mobile nodes MN1 and MN13 store information on the estimated distance to a foreign node and calculated position information in the method as previously explained in FIG. 5, and transmit this information to other connected mobile nodes to share it with them (S530).

As such information is shared between the mobile nodes, it is possible for the anchor node AN1 to collect the connectivity information of the mobile nodes MN1 to MN13, the estimated distance information, and a specific mobile node's position information and transmit the collected information to the position estimation server 100.

The position estimation server 100 is able to estimate the position of a target mobile node among the mobile nodes MN1 to MN13 by using the connectivity information of the mobile nodes MN1 to MN13, the estimated distance information, and a specific mobile node's position information.

Figure 6:
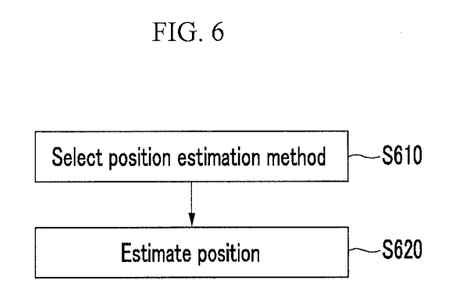
FIG. 6 is a flowchart showing a method for a position estimation server to estimate the position of a mobile node according to an exemplary embodiment of the present invention.

FIG. 6 is a flowchart showing a method for a position estimation server to estimate the position of a mobile node according to an exemplary embodiment of the present invention.

Referring to FIG. 6, the position estimation server 100 selects a position estimation method to estimate the position of a mobile node (S610). As the estimation method, a sequential method and a batch processing method may be employed.

When initially starting position estimation, the position estimation server 100 selects the sequential method as the position estimation method, estimates the position of a mobile node by the sequential method, and acquires a measured value of the position of the mobile node. Then, when estimating the position of the mobile node again, the position estimation server 100 may select either the sequential method or the batched processing method.

The position estimation server 100 estimates the position of the mobile node by the selected estimation method (S620).

Figure 7:
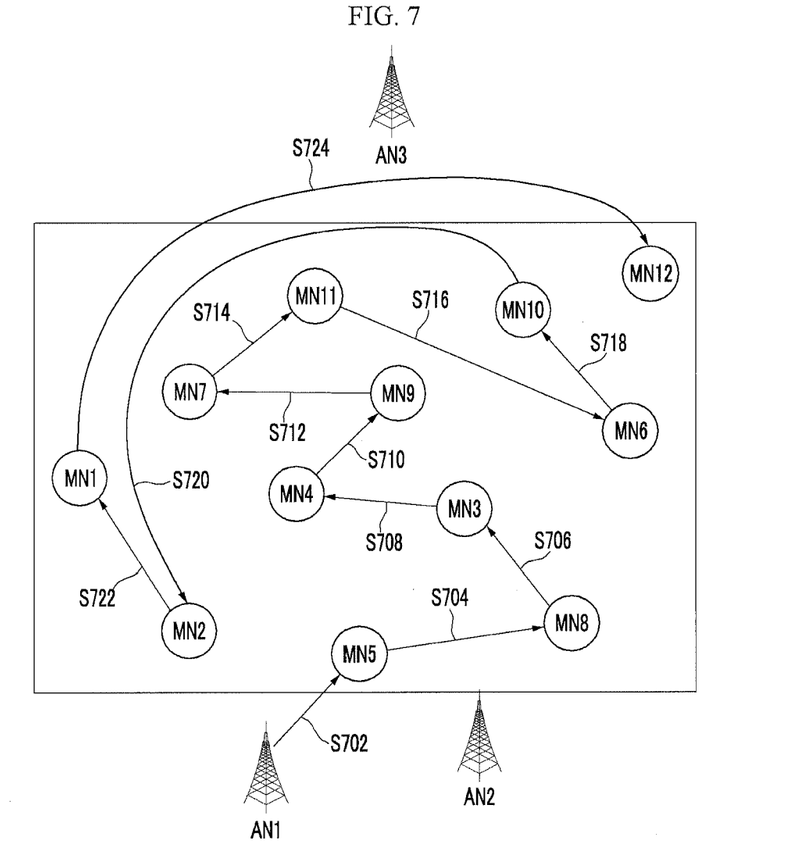
FIG. 7 is a view showing a sequential position estimation method according to an exemplary embodiment of the present invention.

FIG. 7 is a view showing a sequential position estimation method according to an exemplary embodiment of the present invention.

Referring to FIG. 7, first of all, the position estimation server 100 estimates the position of the mobile node MN5 by using position information of reference nodes, for example, the anchor node AN1 of FIG. 1 and the anchor node AN2, which already know their position information, and connectivity information of the anchor nodes AN1 and AN2 (S702).

Next, the position estimation server 100 estimates the position of the mobile node MN8 by using the position information of the anchor node AN2, the estimated position information of the mobile node MN5, and their connectivity information (S704).

In this manner, the position estimation server 100 sequentially estimates the positions of the other mobile nodes MN3, MN4, MN9, MN7, MN11, MN6, MN10, MN2, MN1, and MN12 in such a manner that the position of the next mobile node is estimated by using the previously estimated position information and connectivity information of the mobile node (S706 to A724).

That is, if the anchor nodes AN1 to AN3 used for estimating the position of a mobile node and the mobile nodes whose positions have been estimated are defined as reference nodes, the position estimation server 100 sequentially estimates the position of mobile nodes, starting from the mobile node connected to the largest number of reference nodes, which are connected to the mobile nodes whose positions have not been estimated as yet. If the number of reference nodes connected to each mobile node is equal, one of the mobile nodes can be arbitrarily selected to estimate the position. At this point, the position estimation method may be based on trilateraltion, and a variety of position estimation methods, for example, an iterative least square method, a direct solution method, a cell-ID method, and so on can be used depending on the number of reference nodes.

Figure 8:
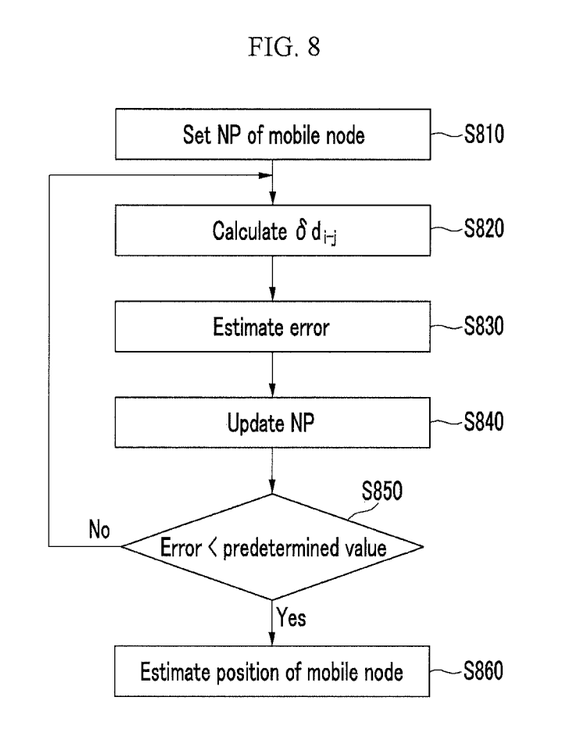
FIG. 8 is a view showing a sequential position estimation method according to an exemplary embodiment of the present invention.

FIG. 8 is a view showing a sequential position estimation method according to an exemplary embodiment of the present invention.

Referring to FIG. 8, first of all, the position estimation server 100 sets the position of a target mobile node to an arbitrary nominal point (NP) (S810). At this point, the position of the mobile node estimated by the sequential method can be set as the NP.

Based on distance information estimated between mobile nodes, distance information estimated between the mobile nodes and the anchor node AN1, and distance information estimated between the mobile nodes and the anchor node AN3, Equation 1 can be derived. The position estimation server 100 calculates $\delta d_{i\text{-}j}$ according to Equation 1 (S820).

[Equation 1]

$$Y = MX \leftrightarrow \begin{bmatrix} \delta d_{1-2} \\ \delta d_{1-7} \\ \delta d_{2-7} \\ \delta d_{2-AN1} \\ \vdots \\ \delta d_{11-AN3} \end{bmatrix} \begin{bmatrix} \hat{x}_{1-2} & \hat{y}_{1-2} & -\hat{x}_{1-2} & -\hat{y}_{1-2} & \cdots & 0 & 0 & \cdots & 0 & 0 \\ \hat{x}_{1-7} & \hat{y}_{1-7} & 0 & 0 & \cdots & -\hat{x}_{1-7} & -\hat{y}_{1-7} & \cdots & 0 & 0 \\ 0 & 0 & \hat{x}_{2-7} & \hat{y}_{2-7} & \cdots & -\hat{x}_{2-7} & -\hat{y}_{2-7} & \cdots & 0 & 0 \\ 0 & 0 & \hat{x}_{2-AN1} & \hat{y}_{2-AN1} & \cdots & 0 & 0 & \cdots & 0 & 0 \\ \vdots & \vdots & \vdots & \vdots & \ddots & \vdots & \vdots & \ddots & \vdots & \vdots \\ 0 & 0 & 0 & 0 & \cdots & 0 & 0 & \cdots & \hat{x}_{11-AN3} & \hat{y}_{11-AN3} \end{bmatrix} \begin{bmatrix} \delta x_1 \\ \delta y_1 \\ \delta x_2 \\ \delta y_2 \\ \vdots \\ \delta x_n \\ \delta y_n \end{bmatrix}$$

where $$\hat{x}_{i-j} = \frac{\overline{x}_i - \overline{x}_j}{\overline{d}_{i-j}} \text{ and } \hat{y}_{i-j} = \frac{\overline{y}_i - \overline{y}_j}{\overline{d}_{i-j}}.$$

$(\overline{x}_i, \overline{y}_i)$ is the NP of mobile node i and $\overline{d}_{i-j} = \sqrt{(\overline{x}_i - \overline{x}_j)^2 + (\overline{y}_i - \overline{y}_j)^2}$. Also, $(\delta x_i, \delta y_i)$ denotes an error in the NP of mobile node i with respect to the actual position thereof. $\delta d_{i-j}$ denotes the difference between distance information estimated between mobile node i and mobile node j and distance information ($\overline{d}_{i-j}$) calculated based on the NP. n denotes the number of target mobile nodes.

Once $\delta d_{i-j}$ is calculated by Equation 1, the position estimation server 100 measures the error in the NP with respect to the actual position (S830). The error in the NP with respect to the actual position can be estimated as in Equation 2:

$$\hat{X} = (M^T M)^{-1} M^T Y \quad \text{[Equation 2]}$$

where T denotes the transpose of a matrix.

The error estimated in this way is applied to the NP to update the NP (S840).

At this point, if the error in the NP with respect to the actual position is not within a predetermined value range (S850), the steps S820 to S840 are repeated. Otherwise, if the error in the NP with respect to the actual position is within the predetermined value range (S850), the updated NP is estimated as the position of the mobile nodes (S860).

Such a batch processing method is used to estimate the positions of the remaining mobile nodes MN1 to MN11 in a batch processing manner, except for the mobile node (MN12 of FIGS. 1 and 2) having only one connection to some other node, with respect to the reference nodes knowing their position information, e.g., the anchor nodes AN1 to AN3 of FIG. 1.

Figure 9:
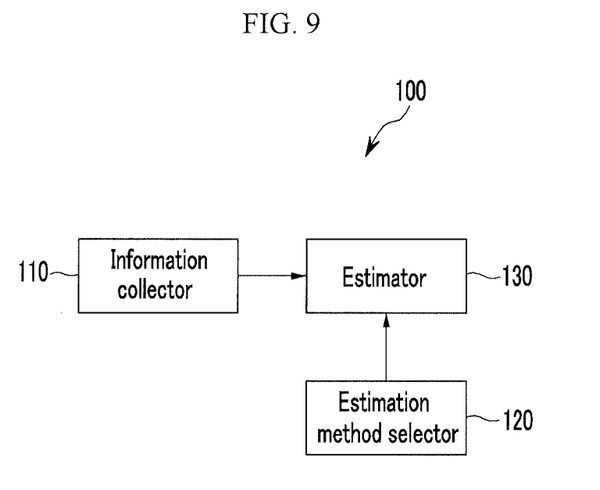
FIG. 9 is a view showing a position estimation server according to an exemplary embodiment of the present invention.

FIG. 9 is a view showing a position estimation server according to an exemplary embodiment of the present invention.

Referring to FIG. 9, the position estimation server 100 includes an information collector 110, an estimation method selector 120, and an estimator 130.

The information collector 110 receives information collected from the connected anchor node AN1. As described above, the collected information may include position information of the anchor nodes AN1 to AN3, position information of mobile nodes, distance information estimated between the nodes, connectivity information between the nodes, and so on.

The estimation method selector 120 selects a position estimation method and informs the estimator 130 about this. At this point, the estimation method selector 120 may select a position estimation method according to control from the outside, or a position estimation method may be determined in advance.

The estimator 130 estimates the positions of mobile nodes by a position estimation method by using the information collected by the information collector 110. In other words, the estimator 130 can estimate the position of a target mobile node by using position information of a minimum number of anchor nodes AN1 to AN3, distance information estimated between the nodes, and connectivity information.

In this way, according to an exemplary embodiment of the present invention, the position estimation server 100 can estimate the position of a mobile node by using a minimum number of anchor nodes knowing their position. The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of estimating position of a target mobile node by a position estimation server, the method comprising:
   receiving information required for position estimation, the information including at least two anchor nodes knowing their position, connectivity information between the anchor nodes and mobile nodes, distance information estimated between the anchor nodes and the mobile nodes, and distance information estimated between the mobile nodes; and
   estimating a position of the target mobile node among a plurality of mobile nodes using the information, the estimating including estimating the position of the at least one target mobile node in a batch manner using information of the position estimated for the at least one target mobile node after sequentially estimating the position of the at least one target mobile node, and
   the batch estimating comprises:
      setting the position of the target mobile node to an arbitrary nominal point;
      estimating an error in the nominal point with respect to an actual position of the target mobile node by using the information required for position estimation;
      updating the nominal point using the error; and
      estimating the nominal point as the position of the target mobile node until the error is less than a predetermined value, and
   where the information is shared across coverage areas of the mobile nodes and used to estimate a position of a next mobile node using the position of the target mobile node estimated and the information shared.

2. The method of claim 1, wherein the estimating comprises sequentially estimating positions of additional target mobile nodes by using the information required for position estimation.

3. The method of claim 2, wherein the sequential estimating comprises estimating the position of the at least one target mobile node by using at least one of an iterative least square method, a direct solution method, and a cell-ID method.

4. The method of claim 2, wherein the sequential estimating comprises estimating the positions of target mobile nodes, starting from the mobile node connected to the largest number of reference nodes among the target mobile nodes,
   wherein the reference nodes comprise anchor nodes knowing their position and mobile nodes whose positions have been estimated.

5. The method of claim 1, wherein the error estimating comprises:
   calculating a difference between the distance information estimated between the mobile nodes and the distance information between the mobile nodes calculated based on the nominal point by using the information required for position estimation; and
   calculating the error in the nominal point by using the difference.

6. The method of claim 1, wherein the information required for position estimation comprises position information calculated by one of the plurality of mobile nodes capable of receiving a satellite signal.

7. The method of claim 1, wherein the position estimation server is connected to the anchor node collecting information required for position estimation, among the two anchor nodes.

8. The method of claim 1, wherein the position estimation server is implemented within the anchor node collecting information required for position estimation, among the two anchor nodes.

9. A server of estimating position of a mobile node, the server comprising:
   an information collector which receives, from one of at least two anchor nodes knowing their position, information required for position estimation, the information including position information of two anchor nodes, connectivity information between the anchor nodes and the plurality of mobile nodes, distance information estimated between the anchor nodes and the mobile nodes, and distance information estimated between the plurality of mobile nodes,
   an estimator which estimates a position of the mobile node among the plurality of mobile nodes using the information, the estimator estimates the position of the at least one target mobile node in a batch manner using the estimated position information of the at least one target mobile node after sequentially estimating the position of the at least one target mobile node, and
   the batch estimating comprises:
      setting the position of the target mobile node to an arbitrary nominal point;
      estimating an error in the nominal point with respect to an actual position of the target mobile node by using the information required for position estimation:
      updating the nominal point using the error; and
      estimating the nominal point as the position of the target mobile node until the error is less than a predetermined value, and
   where the information is shared across coverage areas of the mobile nodes and used to estimate a position of a next mobile node using the position of the target mobile node estimated and the information shared.

10. The server of claim 9, wherein the position estimator further comprises an estimation method selector for selecting one position estimation method to estimate the positions of the plurality of mobile nodes.

11. The server of claim 10, wherein the position estimation method comprises a sequential method for sequentially estimating the positions of the plurality of mobile nodes and a batch method for estimating the positions of the plurality of mobile nodes in a batch manner.

12. The server of claim 11, wherein, when initially starting the position estimation of the plurality of mobile nodes, the estimation method selector selects the batch method as the position estimation method.

13. The server of claim 11, wherein, in the sequential method, the estimator estimates the positions of target mobile nodes, starting from the mobile node connected to the largest number of reference nodes among the target mobile nodes,
   wherein the reference nodes comprise anchor nodes knowing their position and mobile nodes whose positions have been estimated.

14. The server of claim 11, wherein, in the batch method, the estimator sets the position of a target mobile node to an arbitrary nominal point, estimates an error in the nominal point with respect to the actual position of the mobile node by using the information required for position estimation, updates the nominal point using the error, and estimates the nominal point as the position of the mobile node until the error is less than a predetermined value.

* * * * *